US012638344B2

(12) United States Patent
Beaufrere

(10) Patent No.: US 12,638,344 B2
(45) Date of Patent: May 26, 2026

(54) TEMPERATURE SENSOR TESTING

(71) Applicant: Carrier Corporation, Palm Beach Gardens, FL (US)

(72) Inventor: Florian Beaufrere, Rouen (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 399 days.

(21) Appl. No.: 18/336,367

(22) Filed: Jun. 16, 2023

(65) Prior Publication Data

US 2023/0408347 A1 Dec. 21, 2023

(51) Int. Cl.
| | |
|---|---|
| *G01K 15/00* | (2006.01) |
| *B60P 3/20* | (2006.01) |
| *B62D 21/20* | (2006.01) |
| *B62D 33/04* | (2006.01) |

(52) U.S. Cl.
CPC .............. *G01K 15/007* (2013.01); *B60P 3/20* (2013.01); *B62D 21/20* (2013.01); *B62D 33/048* (2013.01); *G01K 15/005* (2013.01)

(58) Field of Classification Search
CPC ...... G01K 15/007; G01K 15/005; G01K 3/08; G01K 1/024; B60P 3/20; B62D 21/20; B62D 33/048; G06Q 10/0832
USPC .............................................................. 374/1
See application file for complete search history.

(56) References Cited

U.S. PATENT DOCUMENTS

| | | | | |
|---|---|---|---|---|
| 7,555,411 | B2 * | 6/2009 | Wang ................... | G01K 15/007 |
| | | | | 702/188 |
| 9,846,086 | B1 * | 12/2017 | Robinson ................. | G01K 3/04 |
| 10,228,188 | B2 * | 3/2019 | Thogersen ............ | F25D 29/008 |
| 2011/0193710 | A1 * | 8/2011 | McIlvain .................. | B60P 3/20 |
| | | | | 220/1.5 |
| 2018/0156675 | A1 * | 6/2018 | Kumahara ........... | G01K 15/007 |
| 2020/0018541 | A1 * | 1/2020 | Villanueva ............ | F25D 17/065 |
| 2022/0092962 | A1 * | 3/2022 | Grinshtain ............ | F25D 29/003 |
| 2024/0060831 | A1 * | 2/2024 | Raget ................... | G01K 15/005 |

FOREIGN PATENT DOCUMENTS

| | | | |
|---|---|---|---|
| IT | TO20110503 | * | 8/2011 |

OTHER PUBLICATIONS

Machine translation of ITTO20110503.
European Search Report for Application No. 22179961.2.

* cited by examiner

*Primary Examiner* — Kristina M Deherrera
(74) *Attorney, Agent, or Firm* — Souad Hakim

(57) ABSTRACT

A method of testing temperature sensors of refrigerated cargo spaces, comprising: installing a wireless temperature sensor in proximity of a cargo space temperature sensor of a refrigerated cargo space; receiving, at a data processing device, temperature data from both the cargo space temperature sensor and the wireless temperature sensor; calculating a temperature difference between the temperature measured by the cargo space temperature sensor and the wireless temperature sensor; and calibrating or replacing the cargo space temperature sensor if the temperature difference exceeds a threshold difference.

19 Claims, 2 Drawing Sheets

TEMPERATURE SENSOR TESTING

CROSS REFERENCE TO RELATED APPLICATIONS

This application claims the benefit of European Patent Application (EP) No. 22179961.2 filed on Jun. 20, 2022.

BACKGROUND

The present invention relates to a method and system for testing temperature sensors of refrigerated cargo spaces.

Refrigerated cargo spaces are used to maintain goods at specific desired temperatures. For example, the trailer of a truck may have a refrigerated cargo space for the transport of perishable goods such as food products.

In the case of transporting perishable goods, the customer often requires a log of temperatures the goods have been subjected to during transport. To accommodate for this a temperature sensor is provided within the cargo space and communicates recorded temperature to a data processing device such that on delivery the customer can check the temperatures the goods have been subjected to during transport.

To ensure that the temperature data logged is accurate it is necessary for the cargo space temperature sensor to be tested and calibrated or replaced when necessary. The customer or government bodies, for example, may impose the frequency of the testing required and the acceptable tolerance.

The present invention provides a method and system for performing testing of cargo space temperature sensor(s).

BRIEF SUMMARY

According to a first aspect of the invention, a method of testing a temperature sensor(s) of a refrigerated cargo spaces is provided. The method comprises: installing a wireless temperature sensor in proximity of a cargo space temperature sensor of a refrigerated cargo space; receiving, at a data processing device, temperature data from both the cargo space temperature sensor and the wireless temperature sensor; calculating a temperature difference between the temperature measured by the cargo space temperature sensor and the wireless temperature sensor; and calibrating or replacing the cargo space temperature sensor if the temperature difference exceeds a threshold difference.

DETAILED DESCRIPTION

Figure 1:
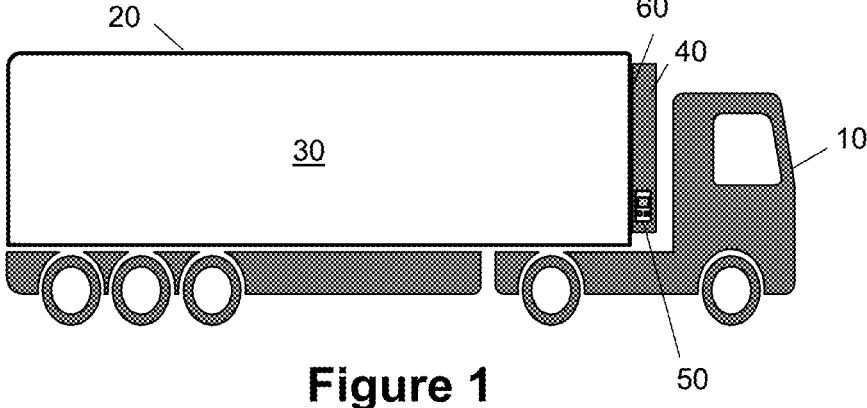
FIG. 1 illustrates a truck and trailer having a refrigerated cargo space.

In a first aspect, a method of testing a temperature sensor(s) of a refrigerated cargo spaces is provided. The method comprises: installing a wireless temperature sensor in proximity of a cargo space temperature sensor of a refrigerated cargo space; receiving, at a data processing device, temperature data from both the cargo space temperature sensor and the wireless temperature sensor; calculating a temperature difference between the temperature measured by the cargo space temperature sensor and the wireless temperature sensor; and calibrating or replacing the cargo space temperature sensor if the temperature difference exceeds a threshold difference.

With this method, it is possible to test that a cargo space temperature sensor of a refrigerated cargo space is operating within an acceptable threshold. Moreover, due to the use of a wireless temperature sensor the test can be rapidly repeated for different cargo space temperature sensors and/or different cargo spaces altogether, for example testing of refrigerated cargo spaces of other trailers, since it can be installed and removed with ease. Further, the use of a wireless temperature sensor allows for the wireless temperature sensor to be placed as close as possible to the cargo space temperature sensor providing for an accurate comparison between the two sensors.

Installing a wireless temperature sensor in proximity of a cargo space temperature sensor may comprise installing the wireless temperature sensor within 1 m, 50 cm, 30 cm, 25 cm, 20 cm, 15 cm, 10 cm, 5 cm, or directly abutting.

The temperature threshold difference may be selected based on the use of the cargo space. For example, for the transport of goods, the temperature threshold difference may be selected in accordance with the EN 13486 standard. Further as an example, if the cargo space is used for the transport of perishable goods the threshold temperature difference may be selected as +/−2° C. If the cargo space is used for transport of pharmaceutical and blood products the threshold temperature difference may be selected as +/−1° C. in the negative temperature ranges, i.e. when the cargo space is below 0° C., and +/−0.5 in the positive temperature ranges, i.e. when the cargo space is above 0° C.

Optionally, calculating a temperature difference comprises: calculating an average temperature measured by the cargo space temperature sensor over a period of time; calculating an average temperature measured by the wireless temperature sensor over the same period of time, and calculating the difference between the average temperature measured by the cargo space temperature sensor and the wireless temperature sensor.

Advantageously, noise in the sensor measurement and/or small transitory fluctuations in temperature between the two sensors are effectively removed by taking an average.

Calculating an average temperature measured by the cargo space temperature sensor over a period of time may refer to a mean average. Calculating an average temperature measured by the wireless temperature sensor over a period of time may refer to a mean average.

Calculating a mean average of the temperature measured by the cargo space temperature sensor and/or the wireless temperature sensor may comprise recording the measured temperature at sampling intervals over a predetermined period of time and then dividing the sum of the measured temperatures by the number of samples.

The temperature sampling rate of the cargo space temperature sensor and/or the wireless temperature sensor may be 10 Hz, or 1 Hz.

Calculating an average of the temperature measured by the cargo space temperature sensor and/or the wireless temperature sensor may begin only after the measured temperature by the cargo space temperature sensor and/or the wireless temperature sensor has not fluctuated beyond predetermined bounds for a predetermined time. In other words, calculating an average of the temperature measured by the cargo space temperature sensor and/or the wireless temperature sensor may begin only after the refrigerated cargo space has reached a steady state temperature. This beneficially ensures that the refrigerated cargo space has achieved a steady state before average temperatures are calculated and reduces the likelihood that the temperature difference between the cargo space temperature sensor and the wireless temperature sensor exceed the threshold because of local temperature variations.

Optionally, the data processing device sends a target temperature command to a temperature control unit associated with the refrigerated cargo space such that the temperature control unit changes the temperature of the cargo space.

In other words, the data processing device sends a command to the temperature control unit such that the temperature control unit causes the refrigerated cargo space to be cooled or heated to a temperature corresponding to the command.

Calculating a temperature difference between the temperature measured by the cargo space temperature sensor and the wireless temperature sensor may begin only after the cargo space has reached a temperature corresponding to the target temperature command.

Calculating a temperature difference between the temperature measured by the cargo space temperature sensor and the wireless temperature sensor may begin only after the measured temperature by the cargo space temperature sensor and/or the wireless temperature sensor has not fluctuated beyond predetermined bounds for a predetermined period of time. This beneficially ensures that the refrigerated cargo space has achieved a steady state before temperature differences between the cargo space temperature sensor and wireless temperature sensor are calculated.

The data processing device may be configured to receive a wired data connection for receiving data from the cargo space temperature sensor. The data processing device may be configured to receive a wired data connection for data communication between the data processing device and the temperature control unit.

The temperature control unit may be a transport refrigeration unit (TRU). The TRU may be installed on a refrigerated transport vehicle, for example a light commercial vehicle (LCV), a truck, or a trailer, and may be configured to provide temperature regulation to the cargo space of said LCV, truck or trailer. The refrigerated cargo space may be a cargo space of a refrigerated transport vehicle, such as one of the vehicles mentioned above. The method may hence be a method of testing temperature sensors of a refrigerated transport vehicle. This method may be used in relation to multiple refrigerated transport vehicles, such as in context of a larger refrigerated transport system, which may comprise a fleet of vehicles each having a transport refrigeration unit as discussed herein.

Optionally, the data processing device sends a plurality of target temperature commands to the temperature control unit, each lasting for a predetermined period of time, such that the temperature control unit changes the temperature of the cargo space a corresponding plurality of times, for a corresponding period of time and to corresponding temperatures and the calculating the temperature difference is conducted for each temperature command.

The cargo space temperature sensor may be calibrated or replaced if the temperature difference between the wireless temperature sensor and the cargo space temperature sensor at each target temperature differs beyond a respective threshold difference for each target temperature.

The threshold difference for each target temperature may be the same for all target temperatures, may be predetermined for each target temperature, or may be proportional to the number of degrees above or below a reference, such as 0 degrees Celsius.

Optionally, the wireless temperature sensor is at least one of a Bluetooth, ZigBee, WLAN temperature sensor.

Advantageously the wireless sensor can be rapidly installed and removed with ease as well as having added flexibility for positioning due to being wireless.

Optionally, there are a plurality of cargo space temperature sensors and the method comprises installing a wireless temperature sensor at each cargo space temperature sensor or installing a wireless temperature sensor at each of a subset of the cargo space temperature sensors.

The method may comprise receiving, at the data processing device, temperature data from both the plurality of cargo space temperature sensors and the wireless temperature sensors.

The method may comprise calculating a temperature difference between the temperature measured by each cargo space temperature sensor and the corresponding wireless temperature sensor located in closest proximity to the cargo space temperature sensor. In other words, each cargo space temperature sensor may have a corresponding wireless temperature sensor and the temperature difference between the two may be calculated, or in the case where there are fewer wireless temperature sensors than cargo space temperature sensors the temperature of each cargo space temperature sensor is compared to the nearest wireless temperature sensor.

The method may comprise calibrating or replacing one or more of the cargo space temperature sensors if the temperature difference between said cargo space temperature sensor and the corresponding wireless temperature sensor exceeds a threshold difference.

Optionally, installing the wireless temperature sensor comprises installing the wireless temperature sensor in proximity of a cargo space temperature sensor of the refrigerated cargo space at a return air inlet of the cargo space.

In other words, both the wireless temperature sensor and the temperature sensor of the refrigerated transport unit are positioned at the return air inlet. The return air inlet may be a return air inlet of a refrigeration unit, for example a transport refrigeration unit.

Optionally, the data processing device is a telematics device, a fleet data recorder, a mobile phone, a tablet, or a computer.

The data processing device may be integrated within a temperature control unit. The temperature control unit may be a transport refrigeration unit and the data processing device may be integrated within the transport refrigeration unit. The data processing device integrated within the transport refrigeration unit may additionally control the transport refrigeration unit.

The data processing device may not be an in-cab telematics device. In other words, it may not be a data processing device of a private passenger vehicle, for example a car. The data processing device may instead be a data processing device of a cargo space. In other words, where the data processing device is associated with the cargo space of a commercial vehicle, such as an LCV, truck or trailer, the data processing device solely processes data associated with environmental regulation of the cargo space as opposed to data relating to operation of the vehicle itself.

The data processing device may comprise one or more of a Bluetooth, ZigBee or WLAN transmitter and receiver to enable wireless data communication with the wireless temperature sensor and/or to enable wireless communication with a temperature control unit associated with the refrigerated cargo space.

According to a second aspect of the invention, a temperature sensor testing system for refrigerated cargo spaces is provided. The temperature sensor testing system comprising: a wireless temperature sensor configured to be removably installed in a location proximate a cargo space temperature sensor of a refrigerated cargo space; and a data processing device configured to receive temperature data from both the cargo space temperature sensor and the wireless temperature sensor; wherein the data processing device is configured to calculate a temperature difference between the temperature measured by the cargo space temperature sensor and the wireless temperature sensor, and to indicate the cargo space temperature sensor requires calibrating or replacing if the temperature difference exceeds a threshold difference.

With this temperature sensor testing system it is possible to test that a cargo space temperature sensor of a refrigerated cargo space is operating within an acceptable threshold. Moreover, due to the system having a wireless temperature sensor the system can be used for the testing of different cargo space temperature sensors and/or different cargo spaces altogether in quick succession since the system can be installed and removed with ease. Further, the system having a wireless temperature sensor allows for the wireless temperature sensor to be placed as close as possible to the cargo space temperature sensor providing for an accurate comparison between the two sensors.

Optionally, the data processing device is configured to calculate a temperature difference between the average temperature measured by the cargo space temperature sensor and the wireless temperature sensor over a predetermined period of time.

Optionally, the data processing device is configured to send a target temperature command to a temperature control unit associated with a refrigerated cargo space.

The wireless temperature sensor may at least one of a Bluetooth, ZigBee, or WLAN temperature sensor.

The data processing device may be a telematics device, fleet data recorder, a mobile phone, a tablet or a computer.

Optionally, the testing system is configured to perform the method as described as the first aspect of the invention above when in combination with a refrigerated cargo space.

According to a further aspect, a servicing system for transport refrigeration units is provided, the servicing system comprising a temperature testing system as described above. The servicing system may be incorporated into a transport refrigeration system that comprises at least one, or a plurality of, cargo spaces and associated transport refrigeration unit(s). The servicing system may be configured to perform the method of testing temperature sensors of the refrigerated cargo spaces as described above. The servicing system may be provided as a part of a transport refrigeration system of the type discussed above, such as a transport refrigeration system comprising a fleet of vehicles each having a transport refrigeration unit as discussed herein. The method may be performed by the servicing system for one or a plurality of refrigerated cargo spaces independently or simultaneously.

Figure 2:
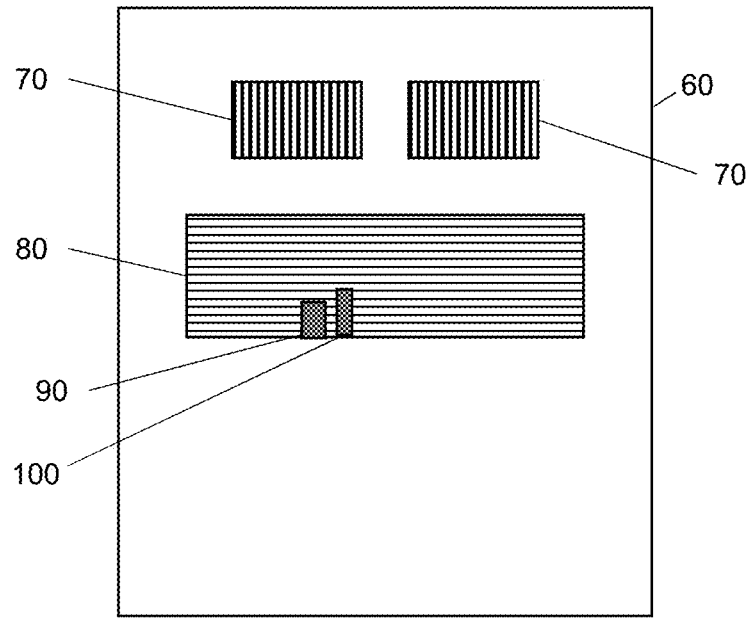
FIG. 2 illustrates an internal wall of the refrigerated cargo space.

Certain exemplary embodiments will now be described in greater detail by way of example only and with reference to the accompanying drawings in which:

FIG. 1 illustrates a truck and trailer having a refrigerated cargo space;

FIG. 2 illustrates an internal wall of the refrigerated cargo space; and

Figure 3:
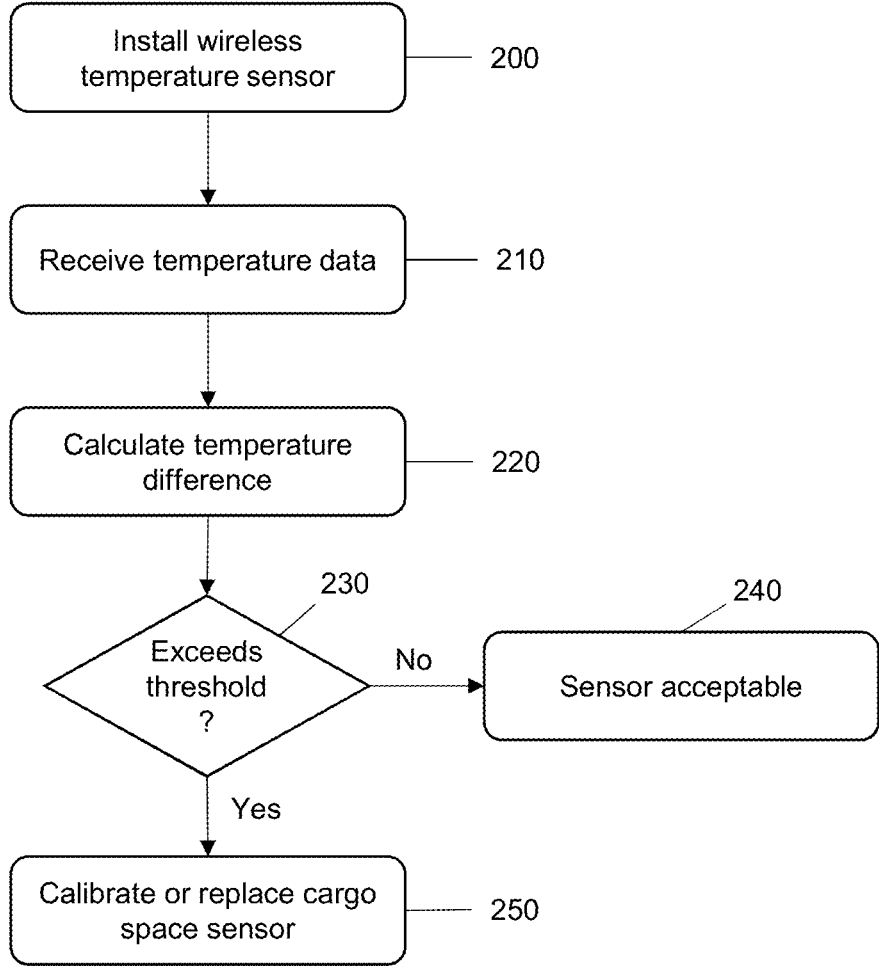
FIG. 3 illustrates a method of testing a temperature sensor of a refrigerated cargo space.

FIG. 3 illustrates a method of testing a temperature sensor of a refrigerated cargo space.

FIG. 1 illustrates a truck 10 and trailer 20 for transporting refrigerated goods such as food items. The trailer 20 forms a refrigerated cargo space 30 defined by outer walls of the trailer 20. To provide temperature regulation of the refrigerated cargo space 30 a temperature control unit 40, or more specifically in this case a transport refrigeration unit (TRU) 40, is provided on a forward wall 60 of the trailer 20.

The TRU 40 comprises a refrigeration circuit (not illustrated) which is configured to absorb heat from within the refrigerated cargo space 30 and reject heat to the environment external to the trailer 20. To allow for heat absorption at the TRU 40 the forward wall 60 of the trailer 20 has air outlets 70 and an air return inlet 80 as illustrated in FIG. 2. The air outlets 70 being configured to allow a stream of air to exit the TRU 40 and enter the refrigerated cargo space 30 after having passed over a heat absorption heat exchanger of the refrigeration circuit. The air return inlet 80 being configured to allow air from within the refrigerated cargo space 30 to enter the TRU 40 and subsequently pass over said heat absorption heat exchanger.

As illustrated in FIG. 2 a cargo space temperature sensor 90 is positioned at the air return inlet 80 to monitor the temperature of the refrigerated cargo space 30. The cargo space temperature sensor 90 measures the temperature of air that is being returned from the refrigerated cargo space 30 to the TRU 40 and is configured to send the measured temperature data to the TRU 40 so that the TRU 40 can adjust the refrigeration to maintain a desired temperature.

The cargo space temperature sensor 90 is a permanent component of the trailer 20 or TRU 40. That is to say, in normal operation of the refrigerated cargo space 30 the cargo space temperature sensor 90 is present such that a desired temperature can be maintained via the TRU 40. Further, the cargo space temperature sensor 90 in combination with a data processing device 50 (discussed later in more detail) can provide a history of the temperature of the trailer during transit of goods. This is particularly beneficial for the customer as it allows them to check whether the goods they are taking delivery off have been exposed to temperatures outside of acceptable limits.

In this example, the TRU 40 comprises an integrated data processing device 50 provided on an outer surface of the TRU 40 such that it can be accessed by an operator. Though it will be appreciated the data processing device 50 in other examples may be installed within the cab of the truck 10, within the cab of a light commercial vehicle (LCV) or may be in the form of a remote device such as a phone or tablet and connecting to the TRU 40 wirelessly via Bluetooth, WLAN, Zigbee and the like.

To check that the cargo space temperature sensor 90 is operating with an acceptable tolerance, a wireless temperature sensor 100 is installed in close proximity to the cargo space temperature sensor 90. In this example, both the cargo space temperature sensor 90 and wireless temperature sensor 100 are installed at the air return inlet 80. This may be conducted at a service interval of the trailer 20, TRU 40, truck 10 etc. It may be conducted at an interval imposed by government standards, customer standards, etc.

The wireless temperature sensor 100 is configured to wirelessly communicate with the data processing device 50. That is, both the cargo space temperature sensor 90 and the wireless temperature sensor 100 provide data representing the measured temperature at the respective sensor to the data processing device 50.

To test the cargo space temperature sensor 90, the method depicted in FIG. 3 is performed. The wireless temperature sensor 100 is installed 200 in close proximity to the cargo space temperature sensor 90 such that the temperature of the air surrounding the two sensors should be substantially uniform.

At step 210 temperature data is received at the data processing device 50 from both the cargo space temperature sensor 90 and the wireless temperature sensor 100.

At step 220 a difference in the temperature recorded by the cargo space temperature sensor 90 and the wireless temperature sensor 100 is determined by the data processing device 50. This may, for example, involve calculating the mean average temperature recorded by each of the sensors over a predetermined period of time and subtracting one from the other.

At step 230 the difference calculated at step 220 between temperature recorded by the cargo space temperature sensor 90 and the wireless temperature sensor 100 is compared by the data processing device 50 to a threshold value, e.g. an acceptable tolerance. The threshold value may be, for example, +/−2° C., +/−1° C., +/−0.5° C.

The data processing device 50 then indicates at step 240 that the cargo space temperature sensor 90 is acceptable, i.e. it is operating within the acceptable tolerance. Otherwise the data processing device 50 indicates that the cargo space temperature sensor 90 should be calibrated or replaced.

The method can be completed by uninstalling the wireless temperature sensor 100, i.e. removing it from the refrigerated cargo space, thus allowing the wireless temperature sensor to be reused in testing of other refrigerated cargo spaces.

The invention claimed is:

1. A method of testing temperature sensors of refrigerated cargo spaces, comprising:

removably installing a wireless temperature sensor in proximity of a cargo space temperature sensor fixed at a return air inlet of a refrigerated cargo space, wherein each of the removably installed wireless temperature sensor and the cargo space temperature sensor is configured to measure a temperature of air that is returned from the refrigerated cargo space;

receiving, at a data processing device, temperature data from both the cargo space temperature sensor and the removably installed wireless temperature sensor;

calculating a temperature difference between the temperature measured by the fixed cargo space temperature sensor and the removably installed wireless temperature sensor; and calibrating or replacing the cargo space temperature sensor if the temperature difference exceeds a threshold difference.

2. The method of claim 1, wherein calculating a temperature difference comprises:

calculating an average temperature measured by the cargo space temperature sensor over a period of time;

calculating an average temperature measured by the removably installed wireless temperature sensor over the same period of time; and calculating the difference between the average temperature measured by the cargo space temperature sensor and the removably installed wireless temperature sensor.

3. The method of claim 1, wherein the data processing device sends a target temperature command to a temperature control unit associated with the refrigerated cargo space such that the temperature control unit changes the temperature of the refrigerated cargo space.

4. The method of claim 3, wherein the data processing device sends a plurality of target temperature commands to the temperature control unit, each lasting for a predetermined period of time, such that the temperature control unit changes the temperature of the refrigerated cargo space a corresponding plurality of times, for a corresponding period of time and to a corresponding temperature and the calculating the temperature difference is conducted for each temperature command.

5. The method of claim 3, wherein the step of calculating the temperature difference is performed after the refrigerated cargo space reaches a temperature corresponding to the target temperature command.

6. The method of claim 1, wherein there are a plurality of cargo space temperature sensors and the method comprises removably installing a wireless temperature sensor at each cargo space temperature sensor or at a subset of the cargo space temperature sensors.

7. The method of claim 1, wherein the refrigerated cargo space is a refrigerated cargo space of a light commercial vehicle (LCV), a truck, or a trailer.

8. The method of claim 1, wherein the data processing device is a telematics device, a fleet data recorder, a mobile phone, a tablet, or a computer.

9. The method of claim 1, being a method of testing temperature sensors of a plurality of refrigerated transport vehicles in a refrigerated transport system, comprising a fleet of vehicles each having a transport refrigeration unit, the refrigerated cargo space, and the cargo space temperature sensor.

10. The method of claim 1, wherein the threshold difference is selected based on the use of the refrigerated cargo space.

11. The method of claim 1, wherein the step of calculating the temperature difference is performed after the measured temperature of air by the cargo space temperature sensor and/or the removably installed wireless temperature sensor has not fluctuated beyond predetermined bounds for a predetermined time period.

12. The method of claim 1, wherein installing the removable wireless temperature sensor in proximity of the cargo space temperature sensor comprises installing the wireless temperature sensor directly abutting the cargo space temperature sensor.

13. The method of claim 1, wherein the method further comprising calibrating the cargo space temperature sensor if the temperature difference exceeds a threshold difference.

14. The method of claim 1, wherein the method further comprising replacing the cargo space temperature sensor if the temperature difference exceeds a threshold difference.

15. A temperature sensor testing system for refrigerated cargo spaces, comprising:

a wireless temperature sensor configured to be removably installed in a location proximate to a cargo space temperature sensor fixed at a return air inlet of a refrigerated cargo space, wherein each of the removably installed wireless temperature sensor and the cargo space temperature sensor is configured to measure a temperature of air that is returned from the refrigerated cargo space; and a data processing device configured to receive temperature data from both the cargo space temperature sensor and the removably installed wireless temperature sensor;

wherein the data processing device is configured to calculate a temperature difference between the temperature measured by the fixed cargo space temperature sensor and the removably installed wireless temperature sensor, and to indicate the cargo space temperature sensor requires calibrating or replacing if the temperature difference exceeds a threshold difference.

16. The temperature testing system of claim 15, wherein the data processing device is configured to calculate a temperature difference between the average temperature measured by the cargo space temperature sensor and the removably installed wireless temperature sensor over a predetermined period of time.

17. The temperature testing system of claim 15, wherein the data processing device is configured to send a target temperature command to a temperature control unit associated with a refrigerated cargo space.

18. The temperature testing system of claim 15, wherein the testing system is configured to test temperature sensors of a plurality of refrigerated transport vehicles, each vehicle comprising a transport refrigeration unit, the refrigerated cargo space, and the cargo space temperature sensor.

19. A servicing system for transport refrigeration units, the servicing system comprising a temperature testing system as claimed in claim 15.

* * * * *